US012655009B2

United States Patent

(12) United States Patent
Paauwe et al.

(10) Patent No.: US 12,655,009 B2
(45) Date of Patent: Jun. 16, 2026

(54) COUPLER DEVICE FOR A BEVERAGE DISPENSING SYSTEM

(71) Applicant: Heineken Supply Chain B.V., Amsterdam (NL)

(72) Inventors: Arie Maarten Paauwe, Amsterdam (NL); Jacobus Petrus Maria Dessing, Amsterdam (NL); Dennis Christiaan Kemp, Amsterdam (NL)

(73) Assignee: Heineken Supply Chain B.V., Amsterdam (NL)

( * ) Notice: Subject to any disclaimer, the term of this patent is extended or adjusted under 35 U.S.C. 154(b) by 0 days.

(21) Appl. No.: 18/722,745

(22) PCT Filed: Dec. 22, 2022

(86) PCT No.: PCT/NL2022/050746
§ 371 (c)(1),
(2) Date: Jun. 21, 2024

(87) PCT Pub. No.: WO2023/121455
PCT Pub. Date: Jun. 29, 2023

(65) Prior Publication Data

US 2025/0059017 A1 Feb. 20, 2025

(30) Foreign Application Priority Data

Dec. 23, 2021 (EP) .................................... 21217322

(51) Int. Cl.

*B67D 1/08* (2006.01)
*B67D 1/12* (2006.01)
*B67D 1/00* (2006.01)

(52) U.S. Cl.
CPC ........... *B67D 1/0831* (2013.01); *B67D 1/125* (2013.01); *B67D 2001/0093* (2013.01)

(58) Field of Classification Search
CPC .. B67D 1/0831; B67D 1/0835; B67D 1/0829; B67D 1/0839; B67D 1/0841; B67D 1/0857; B67D 1/125; B67D 2001/0094; B67D 2001/0093; B67D 1/0845; Y10T 137/6137; Y10T 137/613
USPC ........ 222/400.7, 66; 137/320, 322; 251/231, 251/243
See application file for complete search history.

(56) References Cited

U.S. PATENT DOCUMENTS 932,153 A * 8/1909 Martin ................ B67D 1/1247 222/66
2,883,999 A 4/1959 Frankfurt
7,059,340 B2 * 6/2006 Hecking ................ E03C 1/108 137/512
12,187,354 B2 * 1/2025 Smith .................. H01Q 1/3275
12,291,442 B2 * 5/2025 Wigman .............. B67D 1/0831
2025/0100864 A1 * 3/2025 Paauwe ................ B67D 1/0841

FOREIGN PATENT DOCUMENTS

WO 2021107781 A1 6/2021

* cited by examiner

*Primary Examiner* — Craig J Price
(74) *Attorney, Agent, or Firm* — Banner & Witcoff, Ltd.

(57) ABSTRACT

The disclosure relates to a coupler device for fluidly connecting a beverage chamber of a beverage container to a beverage dispensing line.

15 Claims, 3 Drawing Sheets

COUPLER DEVICE FOR A BEVERAGE DISPENSING SYSTEM

RELATED APPLICATIONS

This application is a National Stage Application under 35 U.S.C. 371 of co-pending PCT application PCT/NL2022/050746 designating the United States and filed Dec. 22, 2022; which claims the benefit of EP Application Serial No. 21217322.3 and filed Dec. 23, 2021, each of which are hereby incorporated by reference in their entireties.

FIELD

The invention relates to coupler devices for coupling a beverage container to a dispensing line beverage, particularly for beer dispensing systems.

BACKGROUND

Conventional coupler devices are arranged for fluidly connecting a beverage chamber of a beverage container, e.g. a beer keg, to a dispensing line. Once connected, the dispensing of the beverage from the container can be controlled by a dispenser, such as a faucet, which is arranged at a downstream end of the dispensing line.

Coupler devices typically include a housing with a fluid conduit extending therethrough between an inlet and an outlet, the coupler inlet being connectable to a container outlet. The fluid conduit of various conventional coupler devices extends, in use when coupled to a container, vertically.

Beverage containers can be interchanged, for example to replace an empty container with a full one. Hence, conventional coupler devices are detachably couplable to the beverage containers. In order to prevent a reflux flow of beverage in the dispensing line once a container has been decoupled, a conventional one-way valve is provided at the vertically extending beverage conduit of conventional coupler devices. The conventional one-way valve includes a valve seat and a valve ball that is disposed within the vertical beverage conduit of the coupler device. The valve ball is received by the seat to seal the beverage conduit, and is pushed upward by a beverage flow from the container towards the dispenser. The vertical extension of the beverage conduit ensures a biasing of the valve ball towards the valve seat under influence of gravity.

However, in coupler devices where, in use when coupled to a container, the beverage conduit extends horizontally instead of vertically a conventional one-way valve does not reliably prevent a reflux flow, particularly because the valve ball cannot be biased towards the valve seat by gravity. Hence, such coupler device is provided with a manually operable shut-off valve that is to be closed manually prior to decoupling the coupling device from the container.

SUMMARY

It is an object to provide an improved coupling device for preventing a reflux flow while being easy to use by a user. It is a further or another object to provide a lower cost coupling device and/or to provide a coupling device that can be used more hygienically.

According to an aspect, a coupler device is provided for fluidly connecting a beverage chamber of a beverage container to a beverage dispensing line. The coupler device comprises a housing with a coupling organ for detachably coupling the housing to the beverage container; a beverage conduit extending through the housing between an inlet which is configured for being connected to a first dispensing line part attached to the beverage container and an outlet which is configured for being connected a second dispensing line part attached to a dispenser; and a broach element movably arranged relative to the housing for broaching the beverage container in order to fluidly connect the beverage chamber to the first dispensing line part. In use of the coupler device when coupled to the beverage container, the beverage conduit includes a horizontally extending beverage conduit section that defines a horizontal flow path for the beverage, wherein, at the beverage conduit section, the coupler device comprises a reflux valve arranged for preventing a reflux flow of beverage through the beverage conduit from the outlet to the inlet of the coupler device. The reflux valve includes a movable valve element which is movable relative to the beverage conduit section along the horizontal flow path for enabling a beverage pressure surge in the dispensing line to travel across the valve. Hence, a pressure surge, also known as water hammer caused by a closing of the dispensing line at the dispenser, propagating in reverse flow direction, i.e. from the dispenser back towards the beverage container, is not bounced off the reflux valve but is instead enabled to propagate across the reflux valve to be absorbed by the beverage container. The beverage chamber of the beverage container often includes gas-filled headspace into which the beverage held by the container is able to expand. Hence, the beverage container may act as a surge tank. By allowing the pressure surge to propagate across the reflux valve, exposure to peak loads on the reflux valve is reduced, and hence the durability of the coupler device as well dispensing line components can be increased.

It has particularly been found that a pressure change in the beverage dispensing line caused by a rapid closure of the dispensing line by the dispenser can be mitigated in most dispensing systems by allowing a volume of beverage of about 2 mL to reflux. Hence, the reflux valve may be arranged for allowing a reflux of beverage of at least 2 mL. To limit the amount of spillage of beverage after decoupling the coupler device from the container, the reflux valve may also be arranged for allowing a reflux of beverage of at most 5 mL.

Optionally, the movable valve element is movable between an upstream end and an opposite downstream end of the beverage conduit section, and wherein a volume of the beverage conduit section between the opposite ends of the beverage conduit section minus a volume of the movable valve element is at least 2 mL. The movable valve element is therefore movable by such an amount that a volume of at least 2 mL of beverage is able to reflux back towards the beverage container. The volume of the beverage conduit section between the opposite ends of the beverage conduit minus the movable valve element is preferably at most 5 mL to prevent excess beverage to spill once the coupler device is decoupled from the container.

Optionally, the movable valve element comprises a closure body which is movably arranged within the beverage conduit section and movable along the horizontal flow path relative to the beverage conduit section between an opening position for allowing a flow of beverage through the beverage conduit section from the inlet to the outlet, and a closing position in which the closure body occludes a through flow opening of the beverage conduit section to prevent a reflux flow of beverage through the beverage conduit section from the outlet towards the inlet.

Optionally, the closure body is spherically shaped. Hence, the closure body can be received at the closing position regardless its rotational orientation.

Optionally, the beverage conduit section comprises an axial guide for guiding a movement of the closure body along a central horizontal axis of the conduit section between the opening position and the closing position. The axial guide ensures the closure body, e.g. a closure ball, to be aligned with the beverage conduit section, such that the closure body is reliably moved back into the closing position upon a reflux flow of the beverage.

Optionally, the beverage conduit section comprises an upstream subsection where an upstream seat is provided for receiving the closure body in the closing position; and a downstream subsection where a downstream seat is provided for receiving the closure body in the opening position.

Optionally, a volume of the beverage conduit section between the upstream seat and the downstream seat minus a volume of the closure body is at least 2 mL, and preferably at most 5 mL. Hence, the closure body can be arranged to travel from the opening position to the closure position by such an amount that a volume of at least 2 mL of beverage is able to reflux back towards the beverage container.

Optionally, the upstream subsection has a constant cross section being substantially equal to a cross section of the closure body and the downstream section has a cross section larger than the cross section of the closure body.

Preferably the closure body has a cross section diameter of between 6-16 mm and the upstream subsection has a cross section diameter of between 6.5-16.5 mm. More preferably the closure body has a cross section diameter of between 8-12 mm and the upstream subsection has a cross section diameter of between 8.5-12.5 mm. Most preferably the closure body has a cross section diameter of approximately 10 mm and the upstream subsection has a cross section diameter of approximately 10.5 mm. A closure body with a relative small cross section diameter requires a small opening size of the inlet of the beverage conduit for a leak tight closing of the opening by the closure body. A cross section diameter of the closure body below 6 mm in use causes the opening size to be too small resulting in too high flow pressures of the beverage flow when dispensing. A closure body with a relative large cross section diameter moves slower through the beverage conduit. A cross section diameter of the closure body above 16 mm in use moves too slowly in the closing position, resulting in beverage spillage upon decoupling of the coupling device from the beverage container.

Preferably the cross section diameter of the upstream subsection is between 0.1-2 mm greater than the cross section diameter of the closure body. More preferably the cross section diameter of the upstream subsection is between 0.3-0.7 mm greater than the cross section diameter of the closure body. Good results were obtained with these sizes of closure body and upstream subsection and size differences between the closure body and the upstream subsection with respect to leak tight sealing of the beverage conduit after first allowing a reflux of beverage of at least 2 mL upon closing of the dispensing line. Diameter size differences between the closure body and the upstream subsection greater than 2 mm result in a too large liquid volume refluxing around the closure body upon closing of the dispensing line causing the closure body to move to slowly in the closing position. Diameter size differences between the closure body and the upstream subsection smaller than 0.1 mm result in too little liquid volume refluxing around the closure body upon closing of the dispensing line causing undesirable high liquid pressure in the beverage conduit and the dispensing line.

Optionally, the downstream seat comprises a central through flow opening for allowing a flow of beverage therethrough. Hence, the closure body can be pushed from the opening position towards the closing position by the reflux flow of beverage.

Optionally, the closure body is unbiasedly arranged within the beverage conduit section and movable between the opening position and the closing position by a beverage flow through the beverage conduit section. Particularly for carbonated beverages, and more particular for malt-based beverages such as beers, biasing springs that may be provided in the dispensing line promote turbulence which causes the beverage to excessively froth when dispensed.

Optionally, the movable valve element comprises a check valve assembly, the check valve assembly being movable within the beverage conduit section along the horizontal flow path and comprising a plunger member being in a fluid-tight sliding engagement with a beverage conduit section wall and having an aperture for allowing a flow of beverage therethrough, and a valve closing member configured for allowing a flow of beverage through the aperture of the plunger member from the inlet to the outlet in an open state of the check valve assembly and for preventing a reflux flow of beverage through the aperture from the outlet to the inlet in a closed state of the check valve assembly.

Optionally, the check valve assembly is spring-loadedly coupled to the beverage conduit section. For example, the check valve assembly may be biased in a neutral position to be returned thereto.

Optionally, a spring is arranged in the beverage conduit section between a downstream spring engagement surface of the plunger member and an upstream spring engagement surface of the coupling device at an upstream end of the beverage conduit section.

Optionally, the spring includes a helical spring having a central through flow opening wherein an outer diameter of the helical spring corresponds to a diameter of the beverage conduit section.

According to another aspect, a system is provided comprising a beverage container having a beverage chamber for containing a beverage, particularly a malt-based beverage such as beer, and a coupler device as described herein, the container having a container outlet provided with a sealing member arranged to enable opening of the beverage outlet, the broach element of the coupling device being configured, when coupled to the container, for opening the container outlet by movement of the broach element in a vertical direction transverse to the horizontal direction in which the beverage conduit section of the coupler device extends.

Optionally, the system comprises a first tube forming the first dispensing line part, the first tube being attached to the beverage container outlet at a upstream end of the first tube; and a second tube forming the second dispensing line part, the second tube being attached to a dispenser at a downstream end of the second tube, wherein the coupler device is configured for coupling its inlet to a downstream end of the first tube, and for coupling an its outlet to an upstream end of the second tube.

It will be appreciated that any of the aspects, features and options described herein can be combined, it will particularly be appreciated that any of the aspects, features and options described in view of the coupler device apply equally to the system, and vice versa.

BRIEF DESCRIPTION OF THE DRAWINGS

Embodiments of the present invention will now be described in detail with reference to the accompanying drawings in which.

DETAILED DESCRIPTION

Figure 1:
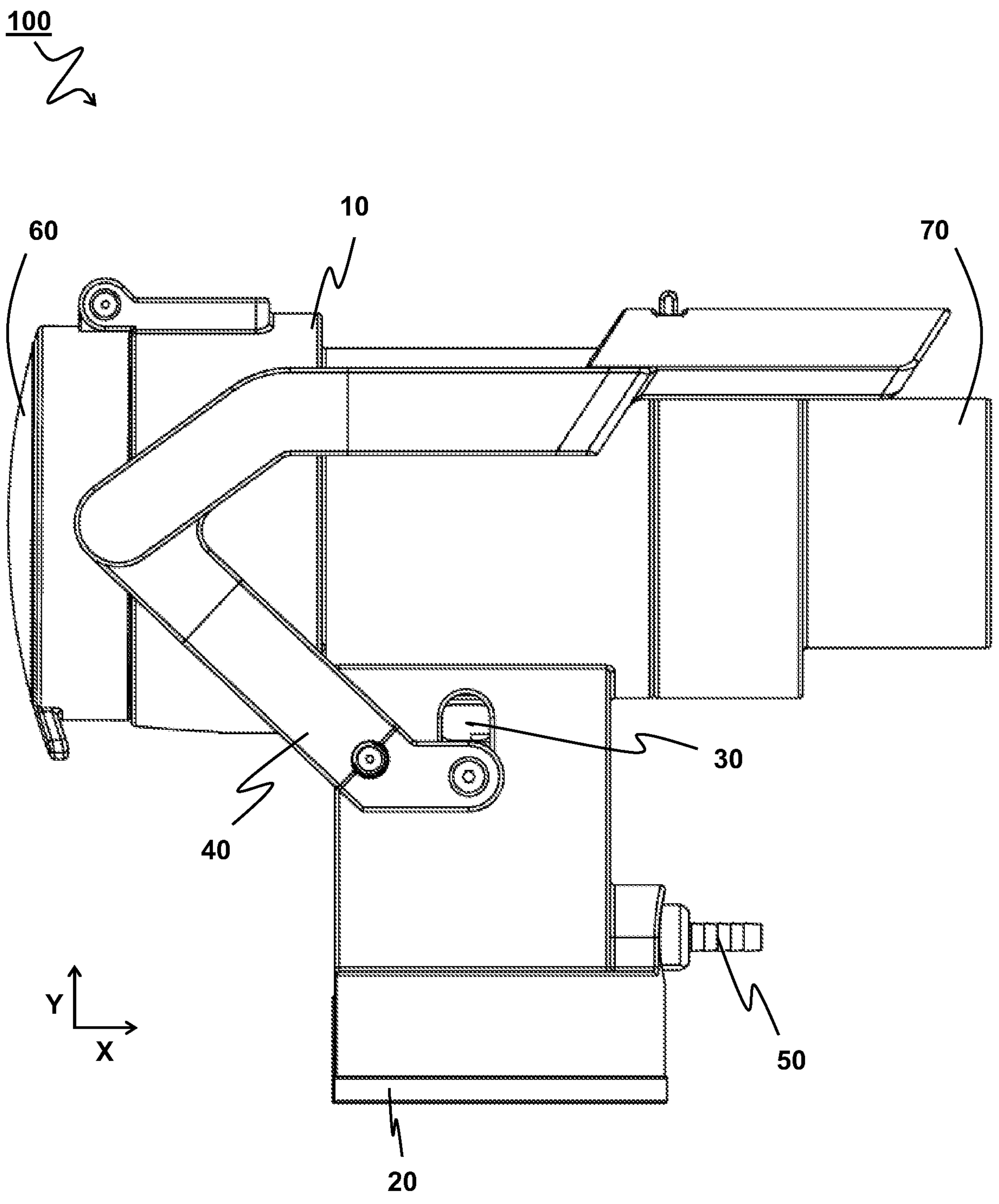
FIG. 1 shows an example of a coupler device.

FIG. 1 shows an exemplary coupler device 100. The coupler device comprises a housing 10 with a coupling organ 20 for coupling the housing 10 to a beverage container, such as a beer keg. The beverage container includes a container body that delimits a beverage chamber for holding a beverage. A broach element 30, e.g. a broach piston, is provided in the housing 10 for broaching the beverage container. The broach element 30 may for example be arranged to open a container seal of the beverage container. The broach element 30 is movable relative to the housing 10 in a vertical direction (Y-direction in FIG. 1). The broach element 30 can be actuated using a broach lever 40, for moving the broach element 30 downwardly to broach the beverage container, and upwardly to release the be broach element 30 from the container.

In this example, the coupler device 100 comprises a gas conduit having a gas inlet port 50 for connecting a gas tube thereto. The gas conduit extends in this example through the coupler housing 10 between the gas inlet port 50 and a gas outlet port which is connectable to a gas inlet of the beverage container.

The coupler device 100 comprises a beverage conduit 80 that extends between an inlet 81 provided at an inlet side 60 of the housing 10 and an outlet 82 provided at an outlet side 70 of the housing 10. The beverage conduit 80 particularly comprises a beverage conduit section 83 that extends in a horizontal direction (X-direction in FIG. 1), transverse to the vertical direction.

Figure 2A:
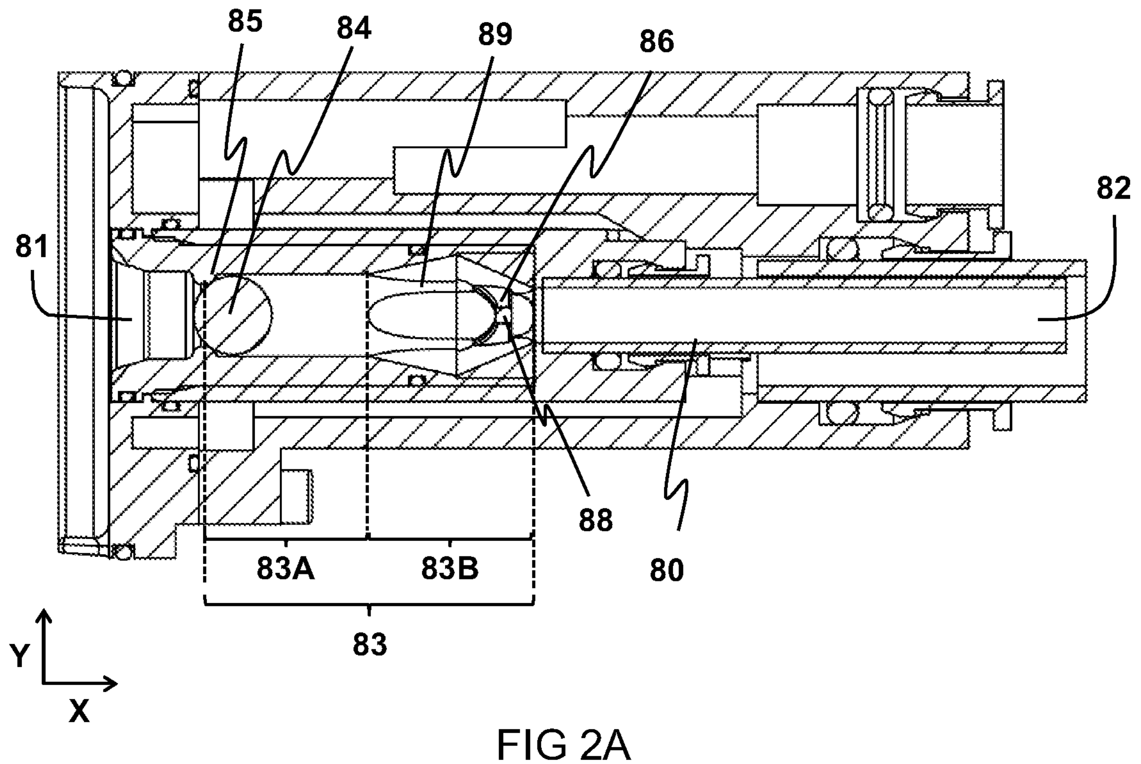
FIGS. 2A and 2B show a detailed cross sectional view of a beverage conduit of a coupler device provided with an exemplary reflux valve.
Figure 2B:
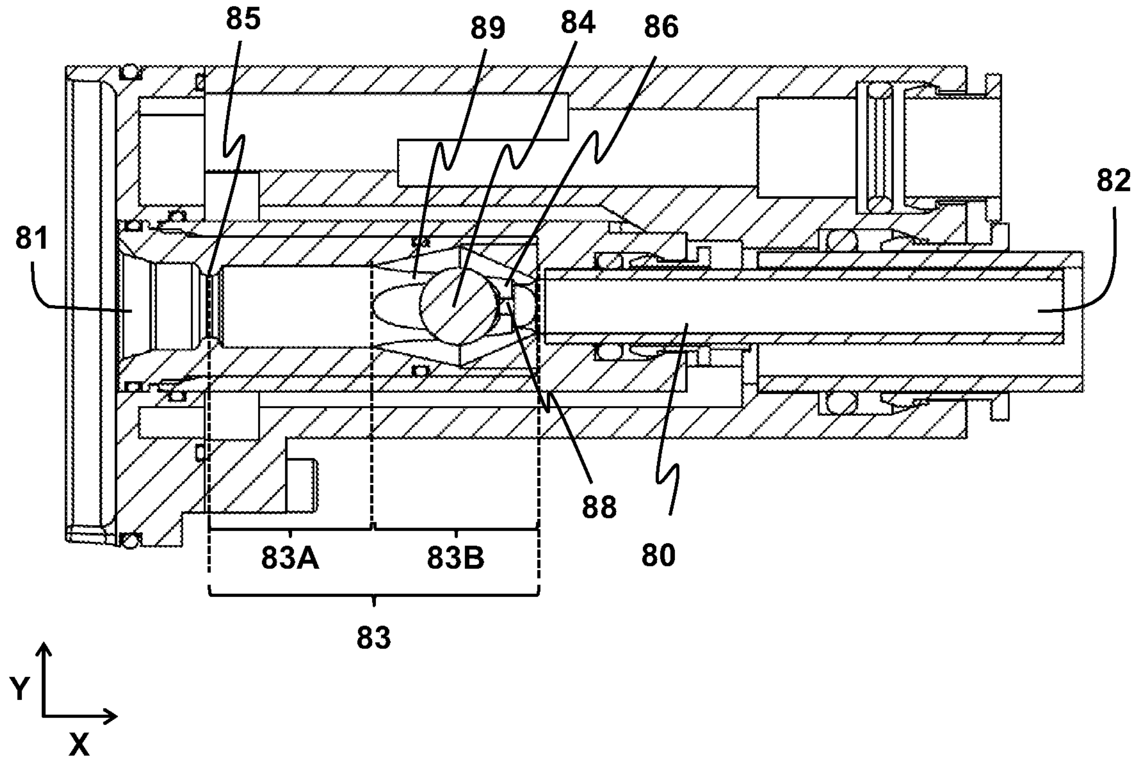

FIGS. 2A and 2B show a detailed cross sectional view of the beverage conduit 80 of a coupler device, particularly of the coupler device 100 as shown in FIG. 1. The inlet 81 is configured for being releasably connected to a first tube that forms the first dispensing line part. The first tube is in this example attached to the beverage container outlet at a upstream end of the first tube. The outlet 82 is configured to be connected to a second tube that forms a second dispensing line part. The second tube is attached to a dispenser, e.g. a faucet, at a downstream end of the second tube. The second tube may be for example be permanently connected to the beverage conduit outlet of the coupler. Prior to broaching the beverage container, a downstream end of the first tube can be connected to the inlet, to create a fluid connection between first tube and the second tube via the beverage conduit 80 of the coupler device 100. Hence a dispensing line is formed between the beverage chamber and the dispenser.

The beverage conduit 80 includes a beverage conduit section 83 that extends horizontally to form a horizontal flow path for the beverage. In this example, for ease of use, the entire beverage conduit 80 extends horizontally.

At the beverage conduit section 83, the coupler device 100 comprises a reflux valve arranged for preventing a reflux flow of beverage through the beverage conduit 80 from the outlet 82 back towards the inlet 81. The reflux valve comprises a movable valve element 84. The movable valve element 84 is movable relative to the beverage conduit section 83 along the horizontal flow path defined by the conduit section 83. The coupler device 100 is arranged for enabling a beverage pressure surge in the dispensing line to travel across the reflux valve.

In particular, in use, the beverage held by the container flows through the dispensing line, via the beverage conduit of the coupler device, to the dispenser at the end of the second dispensing line when the dispenser is opened. After having dispensed a beverage, e.g. after having drafted a beer beverage, the dispenser is closed to stop the flow of beverage from the container. Due to the inertia of the flowing beverage, the sudden closing of the dispenser causes the beverage to exert a force on the closed dispenser, which causes a pressure buildup upstream of the dispenser. The pressure buildup results in a pressure surge being propagated along the dispensing line in the reverse flow direction, i.e. from the dispenser back towards the beverage container. This is also know as water hammer, or hydraulic shock.

By allowing the movable valve element to move in the reverse flow direction, the pressure surge is able to propagate across the valve element 84 towards the beverage container. The beverage container may act as a surge vessel to absorb the pressure surge. A pressure upstream and a downstream side of the moving valve element 84 can accordingly be leveled.

The coupler device 100 is particularly arranged to allow a beverage volume of at least 2 mL to reflux prior to closing of the reflux valve and/or whilst the reflux valve is closed. A volume of about 2 mL is found to be appropriate to level out any residual pressure differences that may be resultant from the pressure surge.

The movable valve element may comprise a closure body. In the example shown in FIGS. 2A and 2B, the movable valve element 84 is embodied as a closure body, particularly as a spherical shaped closure body. The spherically shaped closure body 84 is movably arranged within the beverage conduit section 83 and movable along the horizontal flow path defined by the beverage conduit section 83 between an opening position for allowing a flow of beverage through the beverage conduit section 80 from the inlet 81 to the outlet 82, and a closing position in which the closure body 84 occludes a through flow opening of the beverage conduit section to prevent a reflux flow of beverage through the beverage conduit section from the outlet 82 towards the inlet 81. FIG. 2A shows the closure body being in the closing position, and FIG. 2B shows the closure body being in the opening position.

The coupler device 100 comprises an upstream seat 85 for receiving the closure body 84 in the closing position; and a downstream seat 86 for receiving the closure body 84 in the opening position. The beverage conduit section may delimit a volume of at least 2 mL between the upstream seat 85 and the downstream seat 86. The upstream seat 85, which has a central through flow opening 88, is arranged at an upstream subsection 83A of the beverage conduit section 83. The upstream subsection 83A has a constant cross section which corresponds to a cross section of the closure body 84. It will be appreciated that some lateral play can be provided between the conduit section wall and the closure body 84 for allowing the closure body to move in the flow direction of the conduit section 83. The play may for example be between 0.1 and 0.3 mm. The downstream seat 86 is arranged at a downstream subsection 83B of the beverage conduit section 83. The downstream subsection 83B has a cross section larger than the cross section of the closure body 84, for allowing the beverage to flow around the closure body 84 while the closure body is being held by the downstream seat 86.

The coupler device 100 comprises an axial guide 89 arranged for guiding the closure body 84 in motion along a center line of the horizontal beverage conduit section 83. The guide 89 prevents the closure body 84 from moving offset from the horizontal flow path defined the conduit section 83, to ensure a reliable return of the closure body 83 to the upstream seat 85. The guide 89 is particularly provided where the cross section of the closure body 84 is smaller than the cross section of the beverage conduit section, in this example in the downstream subsection 83B.

The closure body 84 is particularly unbiasedly provided in the beverage conduit section 83. Hence, the closure body 84 is moved between the closing and opening positions under influence of the beverage flow.

Figure 3:
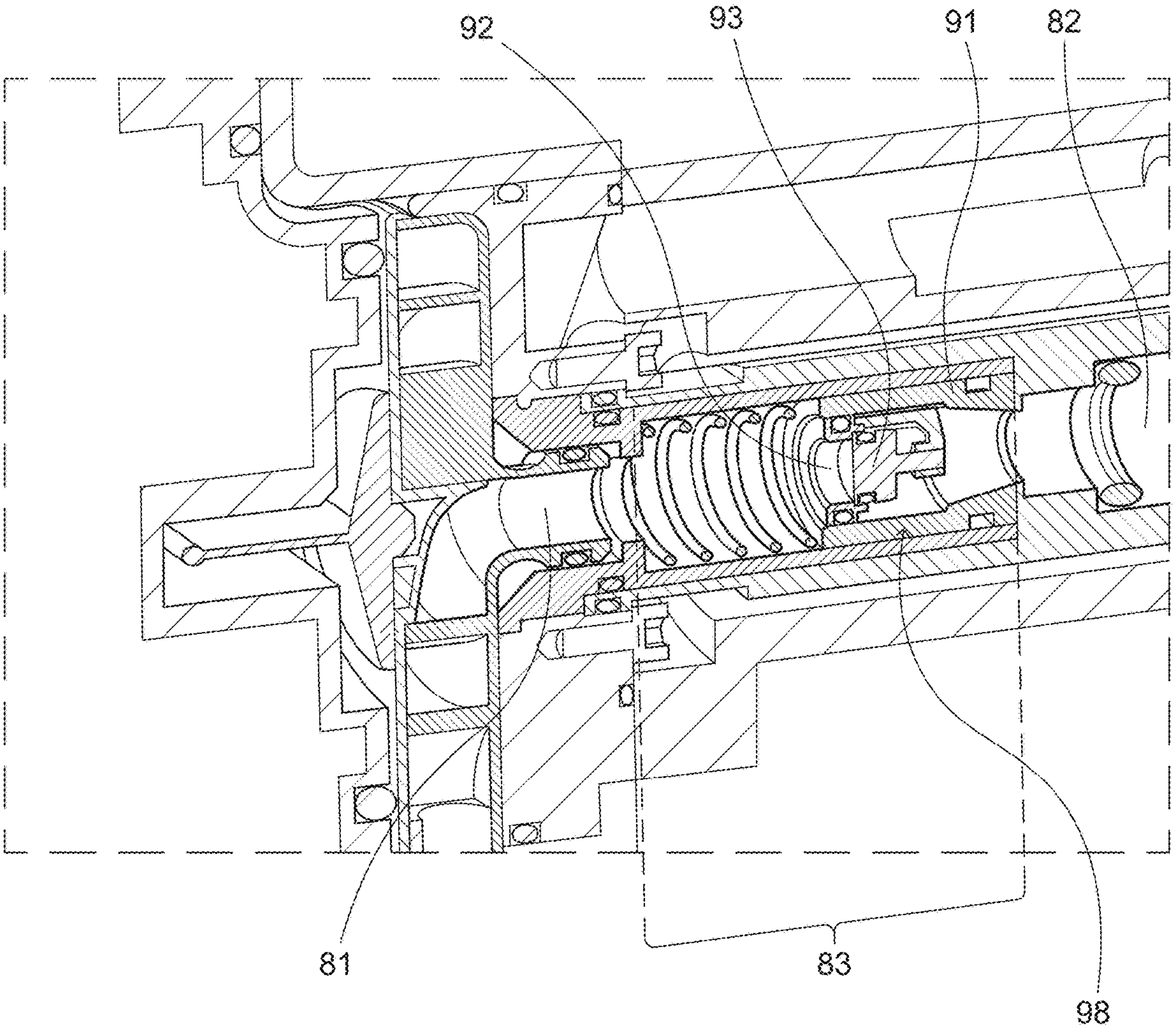
FIG. 3 shows a detailed view of beverage conduit of a coupler device provided with an exemplary reflux valve for a coupler device.

FIG. 3 shows another, e.g. alternative, example of a reflux valve provided in the beverage conduit section 83 of the coupler device 100. Here, the movable valve element 84 is embodied as a check valve assembly 98, which comprises a plunger member 91 being in a fluid-tight sliding engagement with a wall of the beverage conduit section 83. The plunger member 91 comprises an aperture 92 for allowing the beverage to flow therethrough. The check valve assembly 98 also comprises and a valve closing member 93 configured for allowing a flow of beverage through the aperture 92 from the inlet 81 to the outlet 82 of the beverage conduit in an open state of the check valve assembly 98 and for preventing a reflux flow of beverage through the aperture 92 from the outlet 82 back to the inlet 81 in a closed state of the check valve assembly 98.

The coupler device 100 also comprises a spring 95 in this example, for biasedly coupling the check valve assembly 98 to the beverage conduit 80. The spring 95 is in this example arranged in the beverage conduit section 83 at an upstream side of the check valve assembly 98, between a downstream spring engagement surface of the plunger member 91 and an upstream spring engagement surface of the coupling device 100.

The check valve assembly 98 is arranged to move along the horizontal flow path defined by the beverage conduit section 83, in the reflux flow direction, i.e. towards the inlet 81 of the beverage conduit 80. The axial displacement of the check valve assembly 98 may account for a pressure difference resultant from the pressure surge. In use, a stroke volume of the movable check valve assembly 98 may be at least 2 mL. Hence, for example, a volume of the beverage conduit section 83 minus a volume of the check valve assembly may be about 2 mL.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A coupler device for fluidly connecting a beverage chamber of a beverage container to a beverage dispensing line, the coupler device comprising:

a housing with a coupling organ for detachably coupling the housing to the beverage container;

a beverage conduit extending through the housing between an inlet which is configured for being connected to a first dispensing line part attached to the beverage container and an outlet which is configured for being connected a second dispensing line part attached to a dispenser; and a broach element movably arranged relative to the housing for broaching the beverage container in order to fluidly connect the beverage chamber to the first dispensing line part;

wherein, in use of the coupler device when coupled to the beverage container, the beverage conduit includes a horizontally extending beverage conduit section that defines a horizontal flow path for beverage; and wherein, at the beverage conduit section, the coupler device comprises a reflux valve arranged for limiting a reflux flow of the beverage through the beverage conduit from the outlet to the inlet of the coupler device, the reflux valve having a movable valve element which is movable relative to the horizontally extending beverage conduit section in a reflux flow direction along the horizontal flow path for enabling a beverage pressure surge in the dispensing line to travel across the reflux valve.

2. The device of claim 1, wherein the movable valve element is movable between an upstream end and an opposite downstream end of the beverage conduit section, and wherein a volume of the beverage conduit section between the upstream end and the opposite downstream end of the beverage conduit section minus a volume of the movable valve element is at least 2 mL.

3. The device of claim 1, wherein the movable valve element comprises a closure body which is movably arranged within the beverage conduit section and movable along the horizontal flow path relative to the beverage conduit section between an opening position for allowing a flow of the beverage through the beverage conduit section from the inlet to the outlet, and a closing position in which the closure body occludes a through flow opening of the beverage conduit section to prevent a reflux flow of the beverage through the beverage conduit section from the outlet towards the inlet.

4. The device of claim 3, wherein the closure body is spherically shaped.

5. The device of claim 3, wherein the beverage conduit section comprises an axial guide for guiding a movement of the closure body along a central horizontal axis of the conduit section between the opening position and the closing position.

6. The device of claim 3, wherein the beverage conduit section comprises an upstream subsection where an upstream seat is provided for receiving the closure body in the closing position; and a downstream subsection where downstream seat is provided for receiving the closure body in the opening position.

7. The device of claim 6, wherein a volume of the beverage conduit section between the upstream seat and the downstream seat minus a volume of the closure body is at least 2 mL.

8. The device of claim 6, wherein the upstream subsection has a constant cross section being substantially equal to a cross section of the closure body and the downstream section has a cross section larger than the cross section of the closure body.

9. The device of claim 6, wherein the downstream seat comprises a central through flow opening for allowing a flow of the beverage therethrough.

10. The device of claim 3, wherein the closure body is unbiasedly arranged within the beverage conduit section and movable between the opening position and the closing position by a beverage flow through the beverage conduit section.

11. The device of claim 1, wherein the movable valve element comprises a check valve assembly, the check valve assembly being movable within the beverage conduit section along the horizontal flow path and comprising a plunger member being in a fluid-tight sliding engagement with a beverage conduit section wall and having an aperture for allowing a flow of the beverage therethrough, and a valve closing member configured for allowing a flow of the beverage through the aperture of the plunger member from the inlet to the outlet in an open state of the check valve assembly and for preventing a reflux flow of the beverage through the aperture from the outlet to the inlet in a closed state of the check valve assembly.

12. The device of claim 11, wherein the check valve assembly is spring-loadedly coupled to the beverage conduit section.

13. The device of claim 11, comprising a spring arranged in the beverage conduit section between a downstream spring engagement surface of the plunger member and an upstream spring engagement surface of the coupling device at an upstream end of the beverage conduit section.

14. A system comprising: a beverage container having a beverage chamber for containing a beverage, the beverage container having a container outlet provided with a sealing member arranged to enable opening of the beverage outlet, and the coupler device in accordance with claim 1, the broach element of the coupling device being configured, when coupled to the beverage, for opening the container outlet by movement of the broach element in a vertical direction transverse to the horizontal direction in which the beverage conduit section of the coupler device extends.

15. The system of claim 14, comprising a first tube forming the first dispensing line part, the first tube being attached to the beverage container outlet at a upstream end of the first tube; and a second tube forming the second dispensing line part, the second tube being attached to the dispenser at a downstream end of the second tube, wherein the coupler device is configured for coupling its inlet to a downstream end of the first tube, and for coupling its outlet to an upstream end of the second tube.

* * * * *